July 11, 1961 C. H. JORGENSEN ET AL 2,991,655
ELLIPTIC SPRING CONSTRUCTION FOR SPEED SWITCH
Filed Dec. 7, 1956 4 Sheets-Sheet 1

INVENTORS
Clarence H. Jorgensen &
BY Willard T. Nickel
Paul Fitzpatrick
ATTORNEY July 11, 1961  C. H. JORGENSEN ET AL  2,991,655
ELLIPTIC SPRING CONSTRUCTION FOR SPEED SWITCH
Filed Dec. 7, 1956  4 Sheets-Sheet 2

INVENTORS
Clarence H. Jorgensen &
BY Willard T. Nickel
Paul Fitzpatrick
ATTORNEY INVENTORS
Clarence H. Jorgensen, &
BY Willard T. Nickel Paul Fitzpatrick
ATTORNEY July 11, 1961  C. H. JORGENSEN ET AL  2,991,655
ELLIPTIC SPRING CONSTRUCTION FOR SPEED SWITCH
Filed Dec. 7, 1956  4 Sheets-Sheet 4

INVENTORS
Clarence H. Jorgensen, &
BY Willard T. Nickel

Paul Fitzpatrick
ATTORNEY

United States Patent Office 2,991,655
Patented July 11, 1961

2,991,655
ELLIPTIC SPRING CONSTRUCTION FOR SPEED SWITCH
Clarence H. Jorgensen and Willard T. Nickel, Milwaukee, Wis., assignors to General Motors Corporation, Detroit, Mich., a corporation of Delaware
Filed Dec. 7, 1956, Ser. No. 626,861
17 Claims. (Cl. 73—537)

Our invention relates primarily to improvements in instruments such as speed responsive devices and in spring structures which may be incorporated in such instruments. The invention is described herein in terms of its preferred embodiment in a multiple speed responsive switch. Such devices commonly comprise means such as flyweights which generate a force in response to rotation of a shaft, springs or other resilient means to oppose the force generated by the flyweights, and switches which are operated by means connecting the flyweights to the springs. For most consistent and accurate operation of a number of switches at different speeds over a considerable range, ordinarily a number of springs are employed which operate in sequence and have different spring rates.

Developing requirements for greater precision in such switches have reached the point that prior spring arrangements, even if manufactured with the greatest precision, are unsatisfactory. An important feature of the speed switch described herein is a new type of spring assembly which is inherently capable of operation with much greater accuracy than the usual coil springs of prior speed switch devices. The reasons for this will be apparent from the succeeding description. Other features of the switch to be described contribute to improved accuracy, endurance, ease of adjustment, and consistency of calibration of the speed switch.

The principal objects of the invention are to provide an improved speed switch or other responsive instrument, to provide a spring assembly of greater precision and consistency and lower cost than those presently known, and to provide a spring device which is particularly suited for precision instruments and readily adaptable to mass production. Other objects and advantages of the invention will be apparent to those skilled in the art from the accompanying drawings and the succeeding description of the preferred embodiment of the invention.

Referring to the drawings.

*General description*

Figure 1:
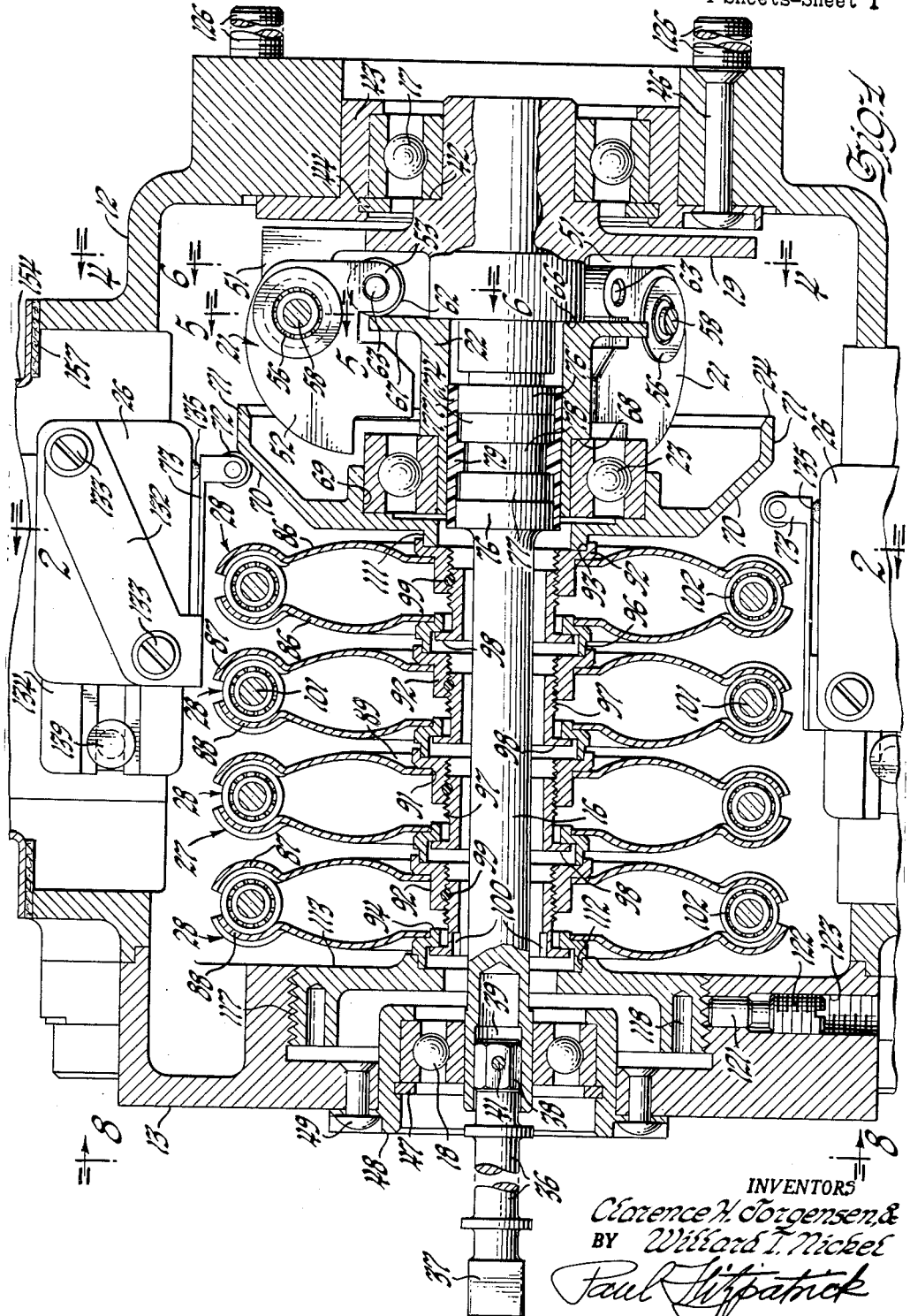
FIGURE 1 is a longitudinal sectional view of a speed switch assembly.
Figure 8:
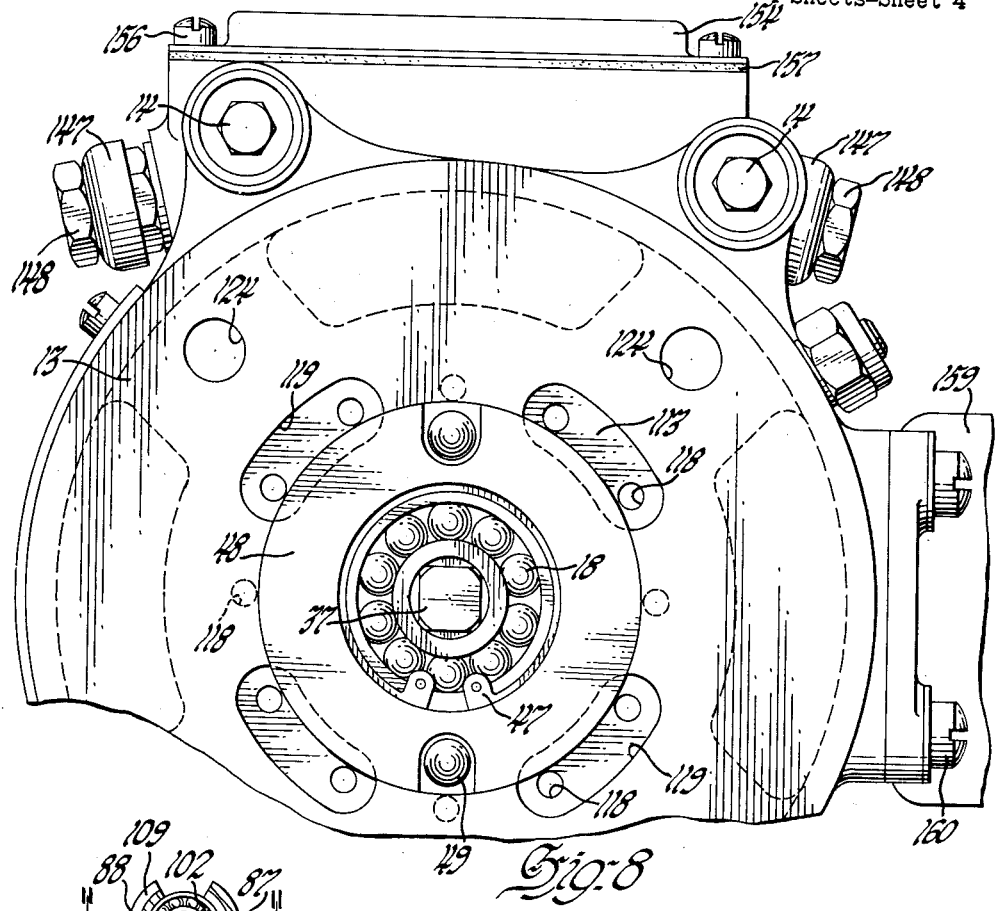
FIGURE 8 is a partial end view of the assembly taken on the plane indicated by the line 8—8 in FIGURE 1.

Referring first to FIGURE 1 for a general description of the assembly, the speed switch device comprises a cup-shaped case or housing 12 into the open end of which is piloted the end plate 13 secured by cap screws 14 (FIGURE 8). A speed shaft or main shaft 16 extending centrally through the case is rotatably mounted in a ball bearing 17 mounted in the case and a ball bearing 18 mounted in the end plate. A flange 19 on the shaft is provided with means for mounting three flyweights 21 which tend to move outwardly under the action of centrifugal force when the shaft is rotated. These flyweights push against a thrust collar 22 slidably mounted on the shaft, which is coupled through ball bearing 23 to a non-rotating switch actuator 24. The switch actuator 24 operates four switches 26 of the sensitive snap action type such as those sold under the trademark Micro Switch. The force generated by the flyweights is opposed by a stack 27 of leaf spring devices 28.

These spring devices will be described in greater detail; but, for the present, it will suffice that each comprises two spring leaves with ball bearings between the ends of the leaves and that the shaft passes through openings in the centers of the spring leaves. The spring assemblies also include means for transmitting force from the collar 24 through the stack of spring devices so that they are operated sequentially at progressively increasing speeds which are the respective operating points of the switches 26. The actuator 24 bears against the first spring device 28 and the fourth spring device 28 bears against the end plate 13. It may be pointed out that the number of switches and the corresponding number of springs is merely illustrative. For example, if only two switches are to be actuated, two spring devices would be provided. The four spring devices are of different strengths, which term is adopted as a convenient one to indicate the force or pre-load above which a spring will begin to close under the action of the flyweight. The maximum opening and closing of each spring is determined by structure to be described, and the spring leaves are preferably of different thickness to provide a difference in the rates of the springs. The pre-load of each spring may also be varied by adjustment of the maximum opening of the spring. It is believed that the general nature of the device will be apparent from the foregoing.

*Main shaft and flyweights*

Figure 4:
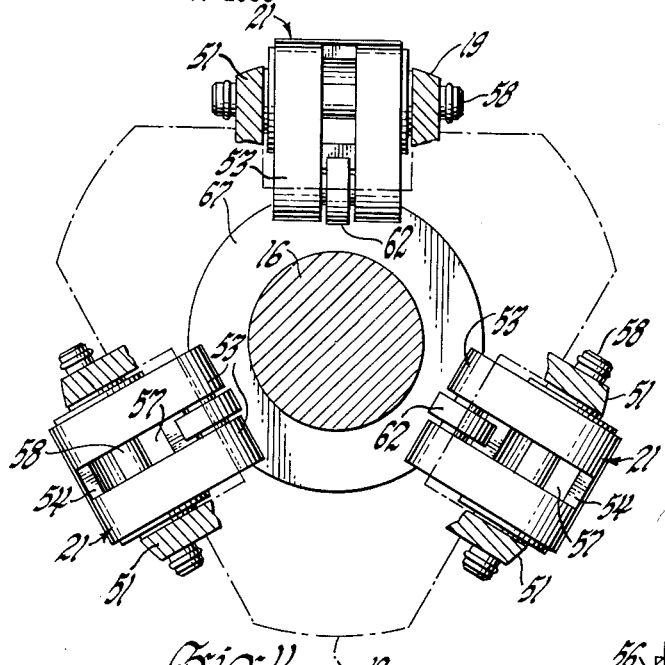
FIGURE 4 is a sectional view of the shaft and flyweight assembly taken on the plane indicated by the line 4—4 in FIGURE 1.

Proceeding now to a detailed description of the structure shown, shaft 16 may be connected to a driving device by a coupling shaft 36 having a square end 37 to fit into a square socket and having a hexagonal end 38 received in a socket 39 in the end of shaft 16. A radial pin 41 retains the coupling shaft 36. The inner race of bearing 17 abuts a shoulder 42 on shaft 16 and the outer race is mounted in a cage 43 by a snap ring 44. The cage is retained in the end of the case by rivets 46. The other main shaft bearing 18 is similarly mounted by a snap ring 47 in a cage 48 fixed to the end plate 13 by rivets 49. The flange 19 on the shaft mounts the three flyweights 21, which are spaced at angles of 120 degrees around the shaft. The flange is originally annular, with a heavy rim, and is machined to the irregular outline indicated in FIGURE 4. Each flyweight is supported between two arms 51 provided by cutting into the rim of the flange. The preferred shape of the flyweights will be apparent from the views in FIGURES 1 and 4. Each flyweight is a single machined piece of metal which may be considered to comprise a principal mass 52 and an actuating finger structure. The finger comprises two arms 53 which are separated by a slot or notch 54 in the portion of the flyweight adjacent the flange 19.

Figure 5:
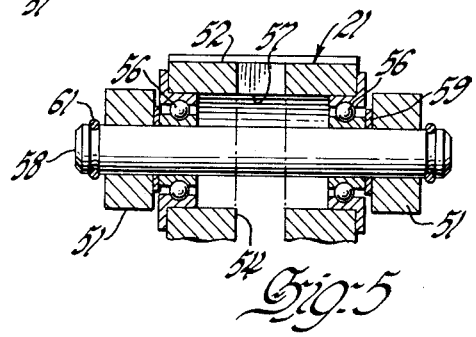
FIGURE 5 is a detail sectional view of a flyweight pivot taken on the plane indicated by the line 5—5 in FIGURE 1.

The flyweight is mounted for outward rotary movement by a ball bearing structure illustrated particularly in FIGURE 5. Ball bearings 56 having flanged outer races are fitted into a bore 57 in the flyweight. A shaft 58 extends through bores in the arms 51 and through the inner races of ball bearing 56. Thrust washers 59 are mounted between the arms 51 and the inner races of the ball bearings. Snap rings 61 retain the shafts 58.

The force is transmitted from the flyweight to the thrust collar 22 by a roller of Stellite 62 mounted on a pin 63 inserted in bores 64 through the arms 53. The pin 63 may be retained by staking the arms 53 at each end of the pin. The Stellite roller has much higher load capacity than a ball bearing of equal size, and cooperates with the thrust collar 22 to prevent galling and fretting of the collar.

The thrust collar 22 (FIGURE 1) is normally urged against a shoulder 66 on main shaft 16 by the spring assembly 27. This thrust collar includes a radial flange 67 of hardened stainless steel against which the rollers 62 bear.

The inner race of ball bearing 23 is pressed onto the shaft or sleeve portion of the thrust collar 22 against a shoulder 68. The outer race of the bearing is pressed into a recess 69 in the actuator 24, which is a disk with a conical surface 70 and an outer cylindrical surface 71. The outer portion of the conical surface acts as a ramp or cam which engages rollers 72 on the operating arms or cam which engages rollers 72 on the operating arms 73 of the switches 26. These switches are located so as to be actuated sequentially by the cam 70, as will be apparent from the showing of the two switches 26 in FIGURE 1. The adjustable mounting of the switches will be described subsequently.

The thrust collar 22 is slidably mounted on the shaft 16 (see FIGURES 1 and 7) by a guide bushing 74 of nylon. The end portions of this bushing are supported radially by portions 76 of the shaft and provide two bearing surfaces spaced axially of the shaft for the thrust collar. Between the shaft portions 76 is a portion 77 of reduced diameter, in the center of which is a groove 78 in the shaft providing radial abutments at the ends of the groove.

The interior of bushing 74 is formed with an integral rib 79 which engages the sides of groove 78 to locate and retain the bushing axially of the shaft. It should be noted that rib 79 is clear of the bottom of groove 78 and likewise the body of the bushing clears the shaft portion 77. Thus expansion of the thick portion of the bushing due to heat will not cause binding against the collar. Excessive clearances to provide for thermal expansion of the nylon at its end portions, which are the bearing parts, is unnecessary because these parts are thin. The heavy rib 79 provides sure axial retention, which the thin-walled end portions of the bushing are not well adapted for.

Figure 7:
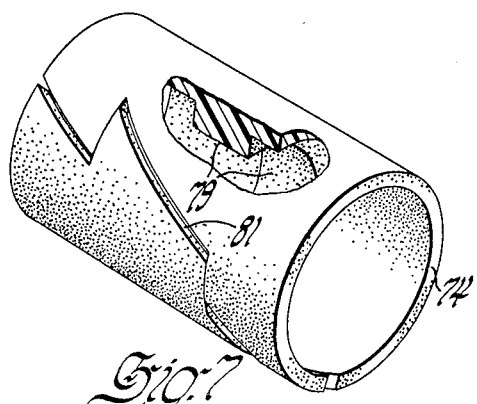
FIGURE 7 is a detailed axonometric view of the guide bearing for the thrust collar.
Figure 6:
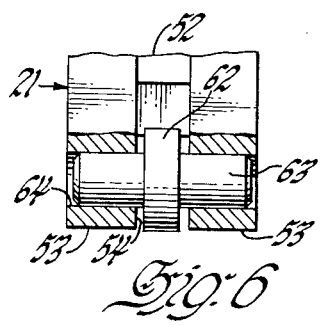
FIGURE 6 is a detail sectional view, illustrating the flyweight force transmitting roller, taken on the plane indicated by the line 6—6 in FIGURE 1.

To provide for mounting the bushing 74, it is split along the skewed dovetail line 81 as shown in FIGURE 7.

The nylon bearing provides two axially distributed guide bearings for the thrust collar of sufficiently close clearance to prevent cocking of the collar, and requires no lubrication. This bearing is the subject matter of U.S. Patent 2,835,540 of Clarence H. Jorgensen for "Guide Bearing," issued May 20, 1958.

Spring assembly

Figure 2:
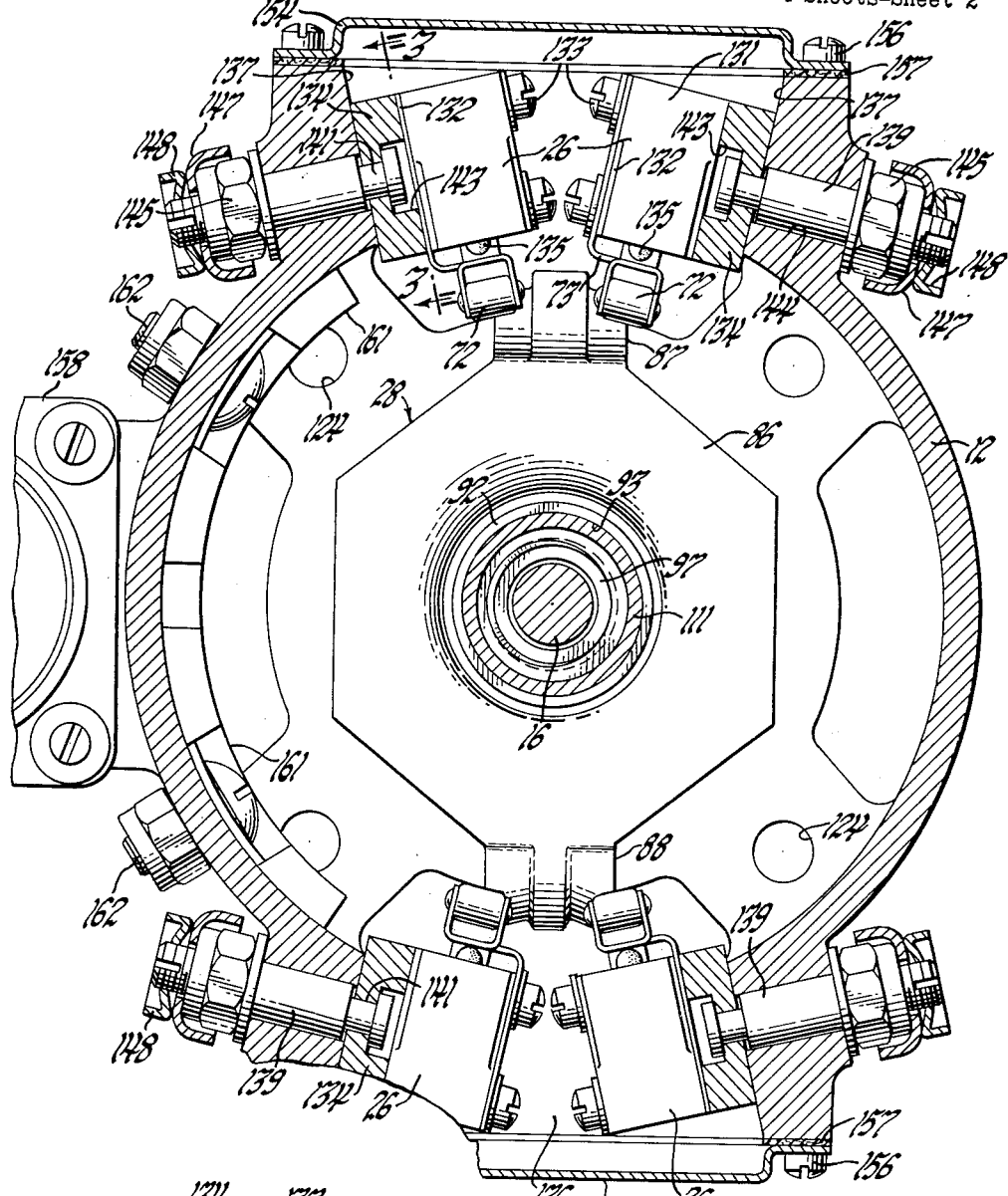
FIGURE 2 is a transverse sectional view of the same taken principally on the plane indicated by the line 2—2 in FIGURE 1.

As previously stated, the movement of the switch actuator 24 in response to the force generated by flyweights 21 is opposed by the spring stack or assemblage 27 comprising four leaf spring devices 28. These leaf spring devices are preferably identical in structure except for the thickness of the leaves. Before describing the complete assemblage, a single spring device will be described with reference to FIGURES 1, 2, 9, and 10. Each comprises two leaves 86 which, as will be apparent from FIGURE 2, are of roughly octagonal outline with two ears or projections 87 and 88 extending from two opposite sides of the octagon. The central portion of the leaf is dished as indicated at 89. Each leaf has a central circular opening 91, one of which receives end plate or ring 92 provided with an internal pilot 93 and internally threaded. End rings 94, which are mounted in the other leaf of the spring device, include an external pilot surface 96. An adjustable sleeve 97, which is threaded into the end ring 92, includes a flange 98 which is urged by the spring into engagement with the outer face of end ring 94. As will be apparent, the parts 92, 94, and 97 cooperate to limit the relaxation of the spring and thereby define its unloaded configuration. A nylon pin 99 is pressed into a hole in the ring 92 tangential to the threaded surface in known manner to preserve the adjustment of the parts 92 and 97. When the switch is assembled, the main shaft 16 extends through the bridle assembly comprising the rings 92 and 94 and sleeve 97. Diametrically opposed slots 95 in the rim of end rings 92 (FIG. 9) and diametrically opposed notches 100 in the interior of sleeves 97 (see the left most sleeve 97 in FIG. 1) accommodate tools which adjust the sleeve relative to the end ring.

Figure 9:
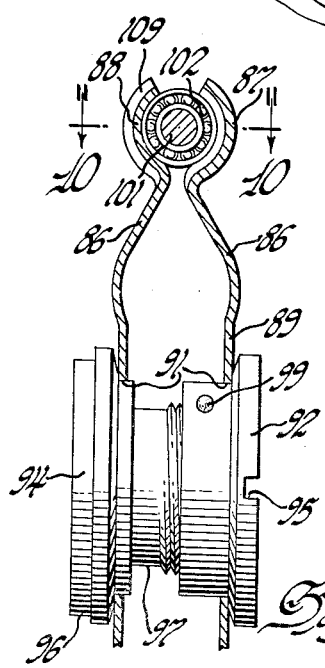
FIGURE 9 is an enlarged partial view of a spring assembly.
Figure 10:
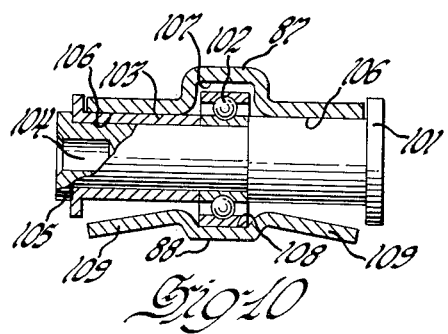
FIGURE 10 is a further enlarged sectional view taken on the plane indicated by the line 10—10 in FIGURE 9 showing the connection between the spring leaves.

A feature of particular importance of the spring device is the bearing arrangement between the leaves which substantially eliminates friction and also eliminates the disadvantages of a single elliptical spring which would be highly stressed at the return bend junction of its two halves. Referring to FIGURES 9 and 10, this bearing device comprises a stepped pin 101 on which is mounted a miniature ball bearing 102 clamped between a shoulder on the pin and a sleeve 103 which is slid unto the pin after the bearing is in place. The sleeve 103 is retained by spinning out the hollow end 104 of the pin 101 to provide a flange 105. The end 87 of each spring leaf 86 is formed to provide two coaxial sockets 106 which are cylindrical and of approximately 90 degrees arcuate extent and which bear against the cylindrical surfaces of pin 101 and sleeve 103. The central part of the end 87 is deformed to create a recess 107 providing clearance from the outer race of bearing 102. The end 88 of the spring leaf is formed with a shallow arcuate cylindrical recess 108 of about 90 degrees extent which conforms to and engages the outer race of bearing 102. The lateral portions 109 of end 88 are formed to be clear of the pin 101 and sleeve 103. As will be apparent, the leaves 86 and identical but are reversed end to end so that each leaf engages the pin and sleeve at one end and the outer race of the ball bearing at the other end. This structure provides a rolling contact bearing of substantially no friction between the spring leaves. If a force is exerted on the end rings 92 and 94 to compress the spring device, the leaves 86 flatten and the ends of the leaves rotate slightly about the axis defined by pin 101, the ball bearing rotating slightly during this movement. Because of the very low friction of this structure, spring hysteresis is very low; in other words, the force exerted by the spring at any given point in its range of compression is almost identically the same whether the spring is being compressed or is relaxing.

The internal pilot 93 of the first end ring 92 fits over a cylindrical boss 111 on the switch actuator 24 and radial surfaces of the boss and the end ring are in abutment. Proceeding from right to left in FIGURE 1, each end ring 94 similarly pilots into the end ring 92 of the next spring device, and the leftmost end ring 94 pilots into a recess 112 in an adjustable abutment ring 113 mounted in the end plate 13 of the case. These piloted engagements insure proper radial alignment of the several spring devices 28 and the abutment between the radial surfaces transmits the force from the switch actuator 24 through the successive spring devices and to the abutment 113. The engagement of these radial surfaces also prevents any cocking of the springs.

It will be appreciated that an important advantage of this spring device is its symmetry. There is no unbalance of the thrust as there will be in a coil spring to which the load must be applied at a point remote from the axis of the spring.

Considering now the operation of the spring assembly 27, it will be apparent that the speed switch is shown at rest. When main shaft 16 is rotated, the centrifugal force developed by the flyweights 21 will increase until it is sufficient to compress the weakest of the four springs. We may assume that the springs are installed in order of increasing strength from right to left in FIGURE 1, although the operation of the device is immaterial of the order in which the springs are installed. When the thrust on collar 22 becomes greater than the resistance of the first spring device 28, the spring will be compressed until the flange 98 of the adjustable abutment 97 engages the face of the second end ring 92, whereupon the force of the flyweights is opposed by the resistance of the second spring assembly 28. The speed at which this occurs may be termed the first operating point of the switch. Similarly, as speed passes to the second operating point, the second spring device 28 will close and its adjustable abutment 97 will engage the end ring 92 of the third spring device. At the third and fourth operating points, the third and fourth spring devices 28 are closed, respectively.

As will be apparent, therefore, the switch actuator 24 has five positions of rest between which it moves at the successive operating points of the speed switch device. At each movement of the switch operator from one position of rest to another, it operates one of the switches 26, these being displaced axially of shaft 16 so that they are in such position that their actuating arms 72, 73 are engaged by the cam surface 70 of the actuator and ride up onto the cylindrical outer surface 71 of the actuator. The adjustable mounting of the switches 26 will be explained subsequently.

Considering now the adjustable spring abutment 113, this is a flanged disk having a threaded outer surface 117 threaded into the interior of end plate 13. A number of holes 118 in the outer face of abutment 113 are accessible through four slots 119 (FIG. 8) in plate 13 so that the axial position of this abutment can be adjusted without dismantling the speed switch device. The adjustment is maintained by a soft plug 121 engaging the threaded surface 117 and pressed against it by a set screw 122 threaded into a bore 123 in the end plate. Four tapped holes 124 (FIGURES 2 and 8) are provided in the end plate to receive cap screws or studs by which the speed switch may be mounted on an engine or other device. Studs 126, FIGURE 1, provide for mounting a cover plate (not shown) or an additional device to be driven by the connecting shaft 36. Such an additional device may be driven from the main shaft 16 of the speed switch device by a suitable connection (not shown).

Switch mounting

Figure 3:
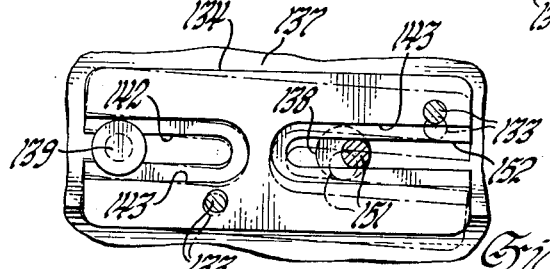
FIGURE 3 is a detail view taken on the plane indicated by the line 3—3 in FIGURE 2 illustrating the adjustable mounting of a switch.

Proceeding now to the structure and mounting of the switches 26; as previously stated, these are commercially available snap action switch assemblies. With reference to FIGURES 2 and 3, the switch 26 includes a body 131. The spring actuating arm 73 is integral with a strap 132 fixed to the switch case by screws 133. The roller 72 which is engaged by the switch actuator is a ball bearing on a shaft mounted in a clevis on the end of the arm 73. This arm actuates a plunger 135 which operates the internal mechanism of switch, which need not be shown or described. The screws 133 pass through the body 131 of the switch as well as the strap 132 and fix the switch to an adjustable mounting block 134. Two switches are mounted at the top of the device and two at the bottom in openings 136 in the side wall of the housing. The switch mounting blocks 134 are secured against the plane walls 137 of the opening by mounting bolts 138 and 139 which are similar except that the bolts 138 include an eccentric construction for adjusting the switch. Referring to FIGURE 3, which shows the internal surface of the block 134, the bolt 139, which is more remote from the actuator 24, has a reduced portion 141 which is concentric with the body of the bolt and is received in a slot 142 extending longitudinally of the mounting block. A clearance slot 143 is provided for the head of bolt 139. The bolt extends through a hole 144 in the wall of the case and is pulled up tight by a nut 145. The threaded end of the bolt has a screw driver slot so that it can be held while the nut is tightened. The structure of bolt 138 and the way in which it is secured are the same as for bolts 139 except that the neck 151 of bolt 138 is eccentric. As illustrated by the broken lines in FIGURE 3, by rotating bolt 138 before tightening the nut, the switch body and thereby the operating roller 72 may be adjusted radially of the actuator 24. In this way, the switch can be adjusted so that the cam 70 moves the arm 73 through the correct range of travel. The slots 142 and 152 permit the mounting block and with it the switch to be moved axially of shaft 16 so that each of the four switches is in the proper axial position to be operated during one of the several steps of movement of the actuator 24. As will be apparent, these adjustments may also be made without dismantling the instrument.

A cover plate 147 fits over the nuts 145 of bolts 138 and 139 and is retained by nuts 148. Access to the switches to locate them during the adjustment or for assembly is provided by the two cover plates 154 retained by cap screws 156 and provided with a gasket 157. The leads to the switches may be brought into the case through a conventional connector 158 partially shown in FIGURE 2 mounted on an elbow 159 (FIG. 8) fixed to the case by cap screws 160. The wiring is kept away from the operating mechanism by a sheet metal shield 161 (FIGURE 2) fixed to the interior of the case by bolts 162. The wiring extending from connector 158 to the switches is not illustrated.

Operation and adjustment of the switch

The operation of the speed switch has been set out heretofore, but may be reviewed briefly for convenience. Rotation of the main shaft 16 carrying flyweights 21 creates a centrifugal force transmitted by roller 62 to the thrust collar 22 which is slidable axially of the shaft. This collar is connected by ball bearing 23 to the non-rotating switch actuator 24, which, through the cam surfaces 70, 71, operates the snap switches 26. As the speed of rotation of the shaft increases from zero and passes through the operating points of the four switches 26, the spring assemblies 28 successively close. When the first spring device closes, the flange 98 of sleeve 97 engages the thrust ring 92 of the second spring device, and so on until all of the springs are closed and the leftmost flange 98 engages the adjustable abutment 113. During the movement of actuator 24 attendant upon the closing of any one of the spring devices 28, one of the switches 26 is actuated.

The shaft speed at which each switch 26 is actuated depends upon the strength and preload of the corresponding spring and upon the location of the switch axially of shaft 16, which may be varied to some extent.

Before the speed switch is assembled, each of the spring devices 28 is adjusted or preloaded by screwing sleeve 97 into end ring 92 until the spring will begin to close at the particular desired force. The springs are then stacked together onto the actuator 24, the end plate 13 is put on the case, and the abutment 113 is turned to move it to the righ in FIGURE 1 to take up any clearance. Thus, with the device at rest, there is no play in the spring assembly 27. Preferably, the lightest spring assembly 28 is very slightly compressed.

It may be noted that the amount of movement of the collar 22 during compression of each of the springs is a fixed value independent of the spring adjustment. A certain fixed clearance is provided between the left face of flange 98 and the face of the adjoining end ring 92. In the particular switch described herein, the closing movement of each spring is six hundredths of an inch. Thus the total movement of the collar 22 is 24 hundredths of an inch. (The switch is shown in FIG. 1 approximately twice size.) The exact value of r.p.m. at which a particular switch operates can be finally adjusted or trimmed by a bodily adjustment of the switch 26 axially of the shaft. As the switch is moved to the left in FIGURE 1, the spring device 28 will have to be compressed farther before the switch is actuated.

Conclusion

Because of the low friction of the springs and their symmetrical construction which eliminates side thrust, the low friction in the flyweight pivots, in the rollers 62, and in the nylon bearing 74, the operation of the switch is very accurate and consistent. Since four springs are provided which may be of widely varying strength, the switch may be made to have operating points at widely varying shaft speeds with a high degree of accuracy of all the operating points. It will be understood that, in general, the thickness of the leaves of a particular spring are such as to adapt it for operation in the neighborhood of a particular value of r.p.m., and that exact setting of r.p.m. is determined by adjustment of the initial loading of the spring and by adjustment of the switch relative to the case.

The advantages of the invention and the suitability of the structure of the preferred embodiment for obtaining the objects of the invention will be apparent to those skilled in the art.

It will be understood that many modifications may be made by the exercise of skill in the art within the scope of the invention, which is not limited by the detailed description of the preferred embodiment.

We claim:

1. In a speed-responsive mechanism comprising a rotatable shaft, means thereon and rotatable therewith adapted to generate a force axially of the shaft dependent upon the speed of rotation of the shaft, output means mounted for reciprocation axially of the shaft coupled to the force-generating means, and a fixed abutment; the improvement comprising a spring assembly mounted between the output means and the fixed abutment comprising, in combination, a plurality of leaf spring devices of different load resistance arranged in tandem, each spring device comprising two opposed spring leaves and means connecting the ends of the leaves, an end ring on the central portion of each leaf, and spring bridling means extending from one end ring through the other end ring of the leaf spring device, the said spring bridling means and the said other end ring having abutments thereon mutually engageable to limit relaxation of the spring device, the end rings of each spring device engaging the end rings of the adjacent spring devices, and the bridling means of each spring device being engageable with an end ring of one adjacent spring device upon predetermined compressive movement of the spring device on which the bridling means is mounted.

2. In a speed-responsive mechanism comprising a rotatable shaft, means thereon and rotatable therewith adapted to generate a force axially of the shaft dependent upon the speed of rotation of the shaft, output means mounted for reciprocation axially of the shaft coupled to the force-generating means, and a fixed abutment; the improvement comprising a spring assembly mounted between the output means and the fixed abutment comprising, in combination, a plurality of leaf spring devices of different load resistance arranged in tandem, each spring device comprising two opposed spring leaves and rolling contact bearing means connecting the ends of the leaves, an end ring on the central portion of each leaf, and adjustable spring bridling means extending from one end ring through the other end ring of the leaf spring device, the said spring bridling means and the said other end ring having abutments thereon mutually engageable to limit relaxation of the spring device, the end rings of each spring device engaging and piloting with the end rings of the adjacent spring devices, and the bridling means of each spring device being engageable with an end ring of one adjacent spring device upon predetermined compressive movement of the spring device on which the bridling means is mounted.

3. A spring device adapted to be mounted between two relatively movable parts comprising, in combination, two spring leaves of substantially identical form disposed in generally parallel face-to-face relation, rolling contact bearing means connecting each end of each leaf to the adjacent end of the other leaf, each spring leaf having a hole in the central portion thereof, two end rings adapted to transmit load from the said parts to the spring leaves, one end ring being mounted in each hole, and a screw adjustably threaded to one end ring having an abutment thereon engageable with the other end ring to limit relaxation of the spring leaves, one said end ring being coupled to one said relatively movable part and the other said ring being coupled to the other said relatively movable part, the screw being engageable with one of said parts to limit contraction of the spring leaves.

4. A multiple-rate spring assembly comprising, in combination, a plurality of leaf spring devices of different load resistance arranged in tandem, each spring device comprising two opposed spring leaves and means connecting the ends of the leaves, an end ring on the central portion of each leaf, and adjustable spring bridling means extending from one end ring through the other end ring of the leaf spring device, the said spring bridling means and the said other end ring having abutments thereon mutually engageable to limit relaxation of the spring device, the end rings of each spring device engaging and piloting with the end rings of the adjacent spring devices, and the bridling means of each spring device being engageable with an end ring of one adjacent spring device upon predetermined compressive movement of the spring device on which the bridling means is mounted.

5. A multiple-rate spring assembly comprising, in combination, a plurality of leaf spring devices of different load resistance arranged in tandem, each spring device comprising two opposed spring leaves and rolling contact bearing means connecting the ends of the leaves, an end ring on the central portion of each leaf, and spring bridling means extending from one end ring through the other end ring of the leaf spring device, the said spring bridling means and the said other end ring having abutments thereon mutually engageable to limit relaxation of the spring device, the end rings of each spring device engaging the end rings of the adjacent spring devices, and the bridling means of each spring device being engageable with an end ring of one adjacent spring device upon predetermined compressive movement of the spring device on which the bridling means is mounted.

6. A multiple-rate spring assembly comprising, in combination, a plurality of leaf spring devices of different load resistance arranged in tandem, each spring device comprising two opposed spring leaves and rolling contact bearing means connecting the ends of the leaves, an end ring on the central portion of each leaf, and adjustable spring bridling means extending from one end ring through the other end ring of the leaf spring device, the said spring bridling means and the said other end ring having abutments thereon mutually engageable to limit relaxation of the spring device, the end rings of each spring device engaging and piloting with the end rings of the adjacent spring devices, and the bridling means of each spring device being engageable with an end ring of one adjacent spring device upon predetermined compressive movement of the spring device on which the bridling means is mounted.

7. A leaf spring device comprising, in combination, two spring leaves disposed in generally parallel relation with each end of each leaf adjacent to the corresponding end of the other leaf and rolling contact bearing means disposed between and connecting each end of each leaf with the corresponding end of the other leaf, each bearing means comprising a first part adapted to engage one leaf, a second part adapted to engage the other leaf, and a rolling contact bearing between the two said parts, each spring leaf having a socket at one end adapted to engage a first said part and a socket at the other end adapted to engage a second said part, the sockets being of less than 180° extent.

8. A leaf spring device comprising, in combination, two spring leaves disposed in generally parallel relation with each end of each leaf adjacent to the corresponding end of the other leaf and rolling contact bearing means disposed between and connecting each end of each leaf with the corresponding end of the other leaf, each bearing means comprising a first part adapted to engage one leaf, a second part adapted to engage the other leaf, and a rolling contact bearing between the two said parts, each spring leaf having a socket at one end adapted to engage a first said part and a socket at the other end adapted to engage a second said part, the sockets being of less than 180° extent, the spring leaves being substantially identical and being disposed in reversed end-to-end relationship relative to each other.

9. A leaf spring device comprising, in combination, two spring leaves disposed in generally parallel relation with each end of each leaf adjacent to the corresponding end of the other leaf and rolling contact bearing means disposed between and connecting each end of each leaf with the corresponding end of the other leaf, each bearing means comprising a first part adapted to engage one leaf, a second part adapted to engage the other leaf, and a rolling contact bearing between the two said parts, each spring leaf having a socket of less than 180° extent at one end adapted to engage a first said part and a socket of less than 180° extent at the other end adapted to engage a second said part, and a bridle connecting the leaves at the central portion of the leaves, the bridle including means for transmitting a load to the spring leaves and including relatively movable elements having opposed mutually engageable abutments thereon engageable to limit relaxation of the spring leaves.

10. A leaf spring device comprising, in combination, two spring leaves of substantially identical form disposed in generally parallel face-to-face relation and reversed end-to-end relation, bearing means connecting each end of each leaf to the adjacent end of the other leaf comprising a shaft, a ring, and rolling contact bearing means between the shaft and the ring, each leaf having first and second ends, the first ends of the two leaves being substantially identical and the second ends of the two leaves being substantially identical, the first end of each leaf being disposed adjacent the second end of the other leaf, the first end of each leaf defining an open-faced arcuate socket adapted to engage a said shaft and the second end of each leaf defining an open-faced arcuate socket adapted to engage a said ring, two rigid members adapted to transmit load to the spring leaves, one member being mounted centrally on each leaf and one member having an abutment thereon engageable with the other member to limit relaxation of the spring leaves, and means rigidly associated with one member engageable with the other member to limit deformation of the spring leaves.

11. A leaf spring device comprising, in combination, two spring leaves of substantially identical form disposed in generally parallel face-to-face relation, rolling contact bearing means connecting each end of each leaf to the adjacent end of the other leaf, each spring leaf having a hole in the central portion thereof, two load rings adapted to transmit load to the spring leaves, one load ring being mounted in each hole, a screw adjustably threaded to one load ring having an abutment thereon engageable with the other load ring to limit relaxation of the spring leaves, and means rigidly associated with one load ring engageable with the other load ring to limit deformation of the spring leaves.

12. A condition-responsive mechanism comprising a fixed abutment, a member reciprocable toward and from the abutment, means responsive to a condition to be measured coupled to the reciprocable member so as to bias the member in one direction relative to the abutment with a force the magnitude of which is dependent upon the value of the condition, a plurality of actuated devices coupled to the member so as to be actuated sequentially by progressive movement of the member toward the abutment, and means connected to the member and abutment so as to bias the member in the other direction relative to the abutment, characterized by the fact that the last-mentioned means is a mutiple-rate spring assemblage comprising a plurality of leaf spring devices, each of different resistance from the others, sequentially flexed one at a time by increasing force exerted on the member by the condition-responsive means, the spring devices being associated end-to-end in tandem, each spring device including adjustable means connecting the ends of the spring device limiting the relaxation of the respective spring device, means coupled to one end of each spring device except one outermost spring device, the last-mentioned means each being engageable with the corresponding means of the next adjacent spring device upon a predetermined degree of flexing of the spring device in response to the force exerted on the spring device by the condition-responsive means; the actuated devices being so related to the said member that a said device is actuated during each movement of the member corresponding to flexing of one of the spring devices.

13. A condition-responsive device as recited in claim 12 in which the means responsive to a condition is a speed-responsive device of the centrifugal type.

14. A condition-responsive device as recited in claim 13 in which the actuated devices are electrical switches.

15. A condition-responsive device as recited in claim 12 in which the actuated devices are electrical switches.

16. A leaf spring device as recited in claim 7 in which the spring leaves are or substantially identical form and are disposed in relatively reversed end-to-end relation.

17. A leaf spring device as recited in claim 10 in which the said abutment is defined by a screw adjustably threaded to one member.

References Cited in the file of this patent

UNITED STATES PATENTS

| | | |
|---|---|---|
| 49,086 | Converse | Aug. 1, 1865 |
| 56,716 | Converse | July 31, 1866 |
| 59,384 | Glidden | Nov. 6, 1866 |
| 162,165 | Godley | April 20, 1875 |
| 1,274,542 | Hartmann | Aug. 6, 1918 |
| 1,955,102 | Smith | Apr. 17, 1934 |
| 2,168,372 | Tabb | Aug. 8, 1939 |
| 2,631,025 | Bone | Mar. 10, 1953 |
| 2,786,667 | Gaubatz | Mar. 26, 1957 |

FOREIGN PATENTS

| | | |
|---|---|---|
| 699,410 | Germany | Nov. 28, 1940 |
| 1,059,562 | France | Nov. 10, 1953 |
| 16,905 of 1909 | Great Britain | July 14, 1910 |